F. T. ROBERTS.
METHOD OF VULCANIZING TIRES.
APPLICATION FILED MAR. 12, 1917.
1,304,909.
Patented May 27, 1919.
2 SHEETS—SHEET 1.
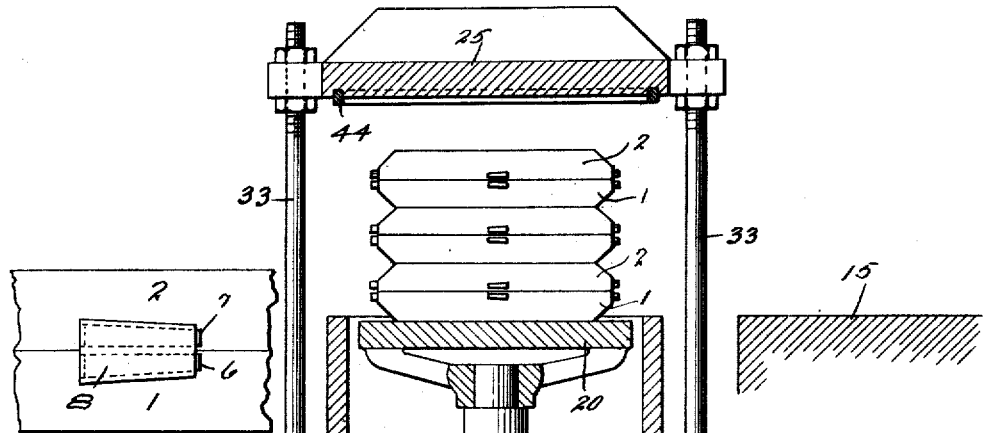
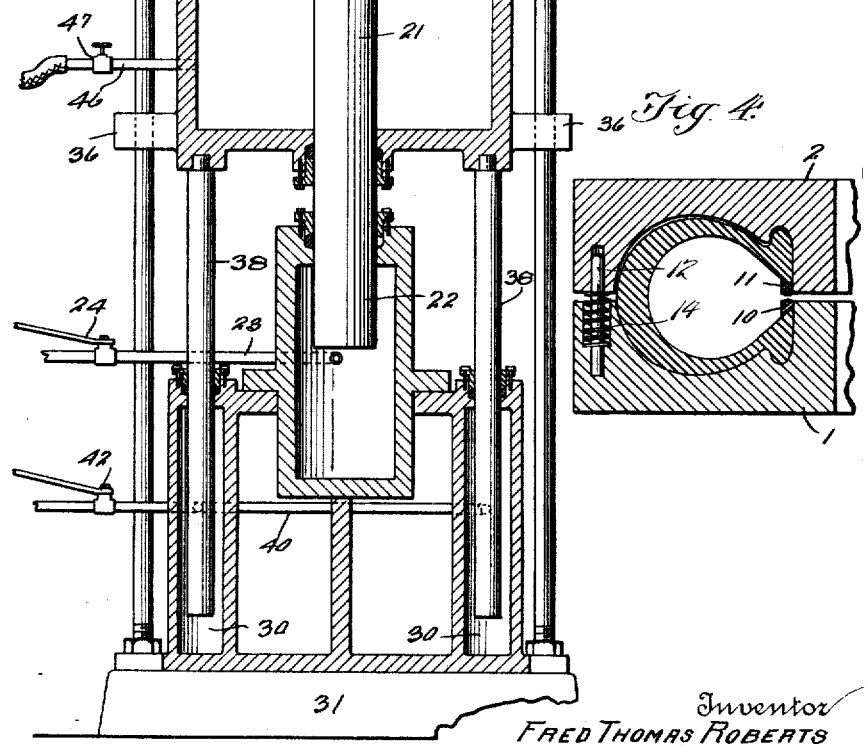
Inventor
FRED THOMAS ROBERTS
By Baker Macklin,
Attorneys Inventor
FRED THOMAS ROBERTS

UNITED STATES PATENT OFFICE.

FRED THOMAS ROBERTS, OF CLEVELAND, OHIO, ASSIGNOR OF ONE-HALF TO RALPH H. ROSENFELD, OF CLEVELAND, OHIO.

METHOD OF VULCANIZING TIRES.

1,304,909.  Specification of Letters Patent.  Patented May 27, 1919.

Application filed March 12, 1917. Serial No. 154,071.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of Vulcanizing Tires, of which the following is a full, clear, and exact description, reference being had to the accompanying drawings.

The object of this invention is to provide a simple effective process for vulcanizing pneumatic tires after they have been formed. Further objects are to produce such a process which may be easily carried out, by which tires may be rapidly handled, and which may be practised by the use of a simple apparatus having no parts liable to break or subject to wear.

Heretofore it has been customary, in vulcanizing tire casings, which are made open on their inner periphery, to place a comparatively heavy inner tube of expansible material within the casing while embracing the exterior of the casing with molds adapted to withstand hydraulic pressure supplied to the inner tube, and then subject the tires to vulcanizing heat to finish the curing. This process is necessarily comparatively slow and has disadvantages in that the tubes for causing the expansion of a casing into the mold are frequently burst by the high pressure used. By the use of my process I eliminate the above difficulties. In practising this process I use a two part mold adapted to embrace the tire casing, and, when brought together, to entirely inclose the same. I place the tire casing within this mold, then surround the mold, with the casing therein, with an atmosphere of compressed air under very high pressure, which enters the open side of the casing. I then entrap the compressed air within the casing by bringing the mold parts tightly together, whereupon these mold parts may be securely locked in this position and subjected to a vulcanizing temperature. The mold parts may then be separated and the completed tire casing removed therefrom.

In carrying out my process I employ certain apparatus, such for example as illustrated in the accompanying drawings, although the present invention is not concerned with the particular character of such apparatus.

Figure 2:
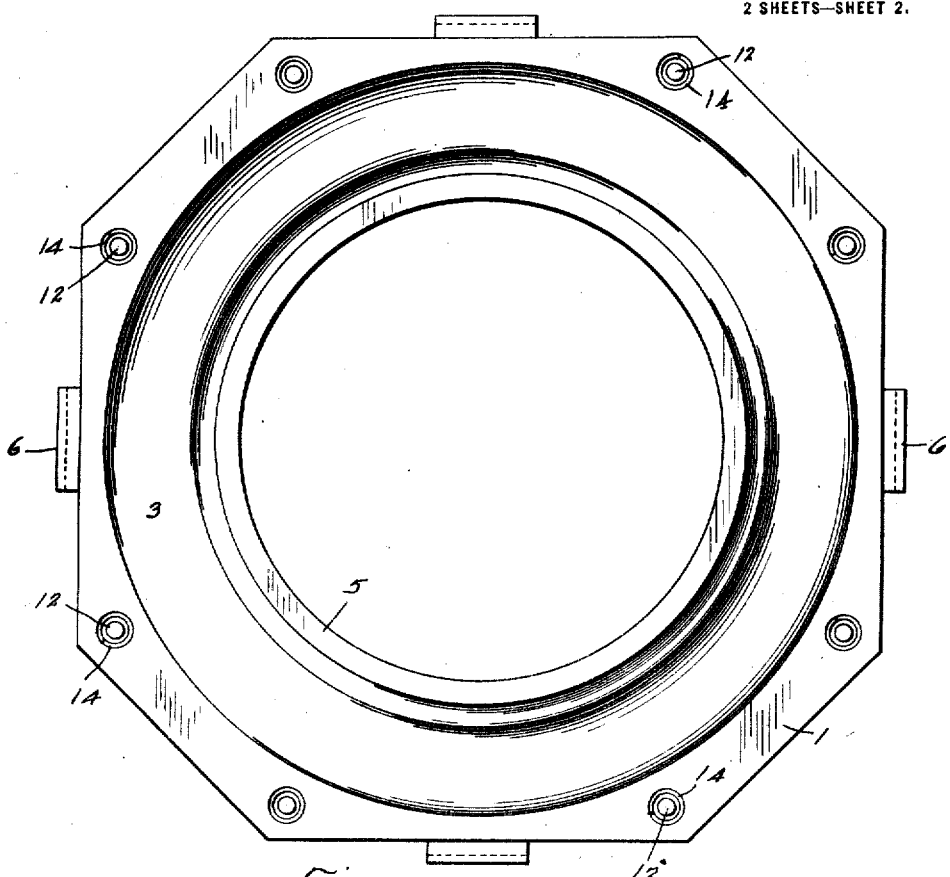
Figure 3:
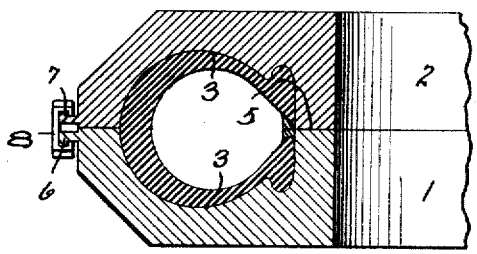
Figure 6:
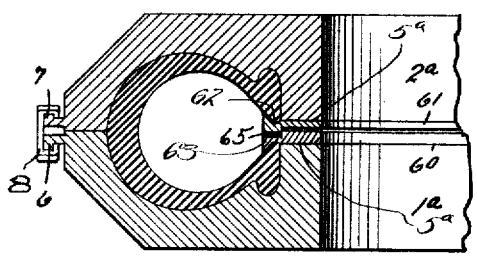

Referring to the drawings, Figure 1 is a vertical section through a hydraulically operated press and a chamber for containing compressed air; Fig. 2 is a plan of one of the mold members; Fig. 3 is a transverse section on an enlarged scale, showing the tire casing within the mold parts when brought together and secured; Fig. 4 is a similar section showing the parts before being brought together; Fig. 5 is a detail of the locking means; Fig. 6 is a section similar to Fig. 3, illustrating an alternative method of sealing the open side of the casing when the parts are brought together.

The molds referred to are designated 1 and 2, and may comprise, as shown, annular members having cavities 3 adapted to embrace the sides and beads of a casing. These molds are preferably formed angular on the exterior and have the interior cut out to form a ring and leave a narrow shoulder 5 inside of the cavities, the shoulders 5 being adapted to meet on a plane passing through the central portion of the casing. The molds may be trimmed down at the exterior to save metal and reduce the weight of the molds to facilitate handling.

At several sides of the molds I provide outwardly extending tongues 6 and 7, on the mold members 1 and 2 respectively. These tongues are L-shaped in cross section and are adapted to be embraced by a female wedge member 8, which may be driven longitudinally over the tongues to securely lock the parts together, while permitting them to be loosened, allowing the gradual escape of high pressure air from the casing as the wedges are being moved.

The casings, after being built up of semi-cured rubber, are placed in the mold 1, and the mold 2 is laid thereon, leaving the edges of the open side of the casing slightly separated. Dowel pins 12 may be used to cause the registration of the molds while springs 14 serve to support the molds above, holding them slightly separated to admit air to the interior of the casing. To seal these edges when they are brought together, I may secure thereto rings of rubber 10 and 11 adapted to meet and connect the edges as the mold members are brought together. These are so cemented or secured to the casing that they may be readily removed after vulcanization of the casing. They are of such width that they may meet before the meeting faces of the mold members are brought together so that when as mold members are brought together these rubber beads are firmly pressed together, causing a tight sealing of the open side of the casing.

Casings may be placed within the mold parts and several of these molds laid one on top of the other, as indicated in Fig. 1, upon a plunger head 20 of a plunger 21 of a hydraulic press. This plunger is shown as extended into a cylinder 22 to which water under suitable high pressure may be led by a pipe 23 under the control of a valve 24. The plunger is lowered after receiving each mold to permit the next mold to be placed in position by sliding it from a floor or platform 15. The cylinder 22 is mounted upon a frame connecting two cylinders 30 resting on a base 31 from which rise vertical struts 33 carrying at their upper ends an anvil 25 against which the molds are brought when the plunger 21 is moved upwardly. Surrounding the plunger 21 and plunger-head 20 is a heavy box 35 and supported and adapted to be moved by plungers 38 entering the cylinders 30 to which water is led by a pipe 40 under the control of a valve 42.

After placing the molds on the plunger-head, as shown in Fig. 1, the box 35 is raised by forcing water into the cylinders 30, bringing its upper edge tightly into contact with a gasket 44 on the under side of the head or anvil plate 25, thereby entirely inclosing the molds with the casings therein. Air under a suitable high pressure is then led to the box 35 by a tubular connection 46 under the control of a valve 47, which air enters the casings through their open sides, raising the pressure within the casing to that of the surrounding atmosphere within the box. The plunger is now raised by forcing water into the cylinder 22, tightly closing the molds and bringing the rubber extensions 10 and 11 into contact and compression, imprisoning the high pressure air within the casings. The pressure may then be released within the box 35 and the box may be lowered while the plunger 20 still holds the molds tightly together. At this time the mold parts may be locked by the female wedge members 8, or other suitable means, whereupon they may be removed and subjected to vulcanizing temperature within a suitable vulcanizing chamber. The very high pressure within the casing causes it to tightly fit the mold, producing very finished and uniform results. The internal pressure, causing the casing to expand, drives out all air from between the exterior of the casing and the inner walls of the molds, such air escaping between the meeting surfaces of the mold members. No difficulty is encountered in this regard in the case of smooth tread casings, but when vulcanizing irregular treads, such as the "non-skid" tires in common use, it is frequently desirable to provide small vent openings leading outwardly through the mold members from the cavities of the molds forming the projections on the tire casing.

After vulcanizing, the wedges may be loosened, allowing the high pressure inside to be relieved. The tire casings may then be removed from the mold and the molds again refilled with uncured casings.

Another method of sealing the open side of the casing when the mold members are brought together is illustrated in Fig. 6. As here shown the mold members 1ª and 2ª have their shoulders at 5ª normally separated when the outer portions of the mold meet, whereby rings 60 and 61 may be placed in position with their grooves 62 and overhanging flanges 63 engaging the interior of the tire casing, as shown. A soft rubber ring 65 may then be placed between the rings 60 and 61, preferably directly between the beads so that the pressure to which the mold is subjected is directly transmitted through the beads and inwardly flaring portions of the tires and the rings 60 and 61 to the rubber ring 65, tightly sealing the open side of the casing.

It will be seen from the foregoing description that by my process I avoid the difficulties, encountered, in the process of placing an expansible member within the casing for causing it to tightly fit the mold during vulcanization, by entrapping air under high pressure within the article, locking the same in the mold with the air so entrapped, and then vulcanizing when in this condition.

Having thus described my invention, what I claim is:

1. The process of vulcanizing a rubber article in the form of a continuous hollow member having an opening at one side, comprising inserting one or more sealing members at the opening, embracing the article by a forming mold into which the article may tightly fit, then surrounding the article and mold with an atmosphere of compressed air and causing the same to enter the interior of the article, then closing the mold in such atmosphere to close the opening in the article and entrap air within the article and exclude the air from between the article and the mold, and then subjecting the article to a vulcanizing temperature while still holding the mold parts securely together inclosing such air within the article.

2. A method of treating hollow rubber articles, comprising submitting them in an unclosed condition to an atmosphere of elastic fluid under pressure while confining them externally by walls complementary to the exterior of the articles, providing means adapted to temporarily close and seal the article to entrap such pressure fluid within the same, vulcanizing the article while so closed, and opening the article at the place of closure.

3. A method of treating hollow rubber articles, comprising submitting them in an unclosed condition to an atmosphere of elastic fluid under pressure while confining them externally by walls complementary to the exterior of the articles, providing means additional to the article to temporarily close and seal the article to entrap such pressure fluid within the same, vulcanizing the article, and thereafter removing the sealing means.

4. A method of vulcanizing hollow rubber articles, comprising submitting them in an unclosed condition to an atmosphere of elastic fluid under pressure while confining them externally by walls complementary to the exterior of the articles, and providing an extension means adapted to close an opening in the article and seal the article by completing its walls to entrap such pressure fluid within the same.

5. The process of vulcanizing a rubber article in the form of a continuous hollow member having an opening, comprising placing such member in a mold and placing in such opening a closing member having a yielding engagement with said hollow member, surrounding the article and mold with an atmosphere of elastic fluid under pressure, entrapping a portion of such compressed fluid within the article by bringing the mold parts together to cause the closing member to seal said opening, then subjecting the article to a vulcanizing temperature.

6. The process of vulcanizing pneumatic tire casings which are open at their inner periphery, comprising closely embracing the exterior of the casings with annular mold members leaving an opening between the mold parts communicating with the interior of the casing, surrounding the casing and mold with an atmosphere of compressed air, sealing the annular opening to the interior of the casing, then subjecting the mold with the casing therein to a vulcanizing heat.

7. The process of vulcanizing pneumatic tire casings having an open side, comprising embracing the casings with a mold having a plurality of parts, placing a rubber closure between the edges of the opening of the casing, surrounding the casing and mold with an atmosphere of compressed air, closing the mold to cause such closure to seal the casing and entrap the compressed air, and then heating the same while within the mold.

8. The process of vulcanizing pneumatic tire casings having an open side, comprising embracing the casings by a two-part mold having annular grooves which receive the casing and hold it with the line of separation around the inner periphery coincident with the plane of separation of the mold members, placing a rubber closure between the edges of the opening of the casing, surrounding the casing and mold with an atmosphere of compressed air, closing the mold to cause such closure to seal the casing and entrap the compressed air, heating the casing while within the mold, and subsequently removing the rubber closure.

In testimony whereof, I hereunto affix my signature.

FRED THOMAS ROBERTS.

Copies of this patent may be obtained for five cents each, by addressing the "Commissioner of Patents, Washington, D. C."